(12) United States Patent
Chapman et al.

(10) Patent No.: US 11,128,467 B2
(45) Date of Patent: *Sep. 21, 2021

(54) SYSTEMS AND METHODS FOR DIGITAL IDENTITY MANAGEMENT AND PERMISSION CONTROLS WITHIN DISTRIBUTED NETWORK NODES

(71) Applicant: NORTHERN TRUST CORPORATION, Chicago, IL (US)

(72) Inventors: Justin Chapman, London (GB); Andrew Czupek, Chicago, IL (US); Andrew Monks, Chicago, IL (US); Anthony Stevens, Herefordshire (GB); Arijit Das, Naperville, IL (US); Christopher Price, Plainfield, IL (US); Wayne Hannaway, Westclif-On-Sea (GB); Zabrina Smith, London (GB)

(73) Assignee: Northern Trust Corporation, Chicago, IL (US)

( * ) Notice: Subject to any disclaimer, the term of this patent is extended or adjusted under 35 U.S.C. 154(b) by 598 days.

This patent is subject to a terminal disclaimer.

(21) Appl. No.: 15/997,467

(22) Filed: Jun. 4, 2018

(65) Prior Publication Data

US 2018/0287800 A1 Oct. 4, 2018

Related U.S. Application Data

(63) Continuation of application No. 15/845,662, filed on Dec. 18, 2017, now Pat. No. 9,992,022.

(Continued)

(51) Int. Cl.
*G06F 21/60* (2013.01)
*H04L 9/32* (2006.01)
(Continued)

(52) U.S. Cl.
CPC ............ *H04L 9/3226* (2013.01); *G06F 21/32* (2013.01); *G06F 21/604* (2013.01); *G06F 21/64* (2013.01);
(Continued)

(58) Field of Classification Search
CPC ... G06Q 2220/00; G06F 21/32; G06F 21/604; G06F 21/64; H04L 9/14; H04L 9/3231;
(Continued)

(56) References Cited

U.S. PATENT DOCUMENTS

| 5,504,818 A | * | 4/1996 | Okano | ................... H04L 9/088 713/166 |
|---|---|---|---|---|
| 6,792,536 B1 | | 9/2004 | Teppler | |

(Continued)

FOREIGN PATENT DOCUMENTS

| CN | 1833397 A | 9/2006 |
|---|---|---|
| CN | 102132304 A | 7/2011 |

(Continued)

OTHER PUBLICATIONS

Australian Examination Report No. 1, dated Jul. 4, 2018, issued in corresponding Australian Application No. 2017352545, 7 pages.

(Continued)

*Primary Examiner* — Brian F Shaw
(74) *Attorney, Agent, or Firm* — Dentons US LLP

(57) ABSTRACT

Embodiments disclosed herein provide systems and methods for digital identity management and permission controls within distributed network nodes. A network node may receive a request to generate a new digital identity record for an entity. The network node may retrieve a template based on an entity type; and receive information, reference documents, and biometric information for the new digital identity record. The network node may associate and store the received information to the data fields in the new digital (Continued)

identity record, generate respective one directional cryptographic hashes of the reference documents and the biometric information, and store the hashes in the new digital identity record while storing the reference documents and biometric information in a non-blockchain repository. The network node may generate a digital identity record block for the new digital identity record, encrypt the digital identity record block, and append the encrypted block to the latest valid blockchain.

18 Claims, 4 Drawing Sheets

Related U.S. Application Data

(60) Provisional application No. 62/455,471, filed on Feb. 6, 2017.

(51) Int. Cl.
*H04L 29/06* (2006.01)
*G06F 21/64* (2013.01)
*G06F 21/32* (2013.01)
*H04L 9/14* (2006.01)

(52) U.S. Cl.
CPC .......... *H04L 9/3231* (2013.01); *H04L 9/3236* (2013.01); *H04L 63/0428* (2013.01); *H04L 63/0861* (2013.01); *H04L 63/102* (2013.01); *H04L 9/14* (2013.01); *H04L 2209/38* (2013.01)

(58) Field of Classification Search
CPC ... H04L 9/3236; H04L 9/3226; H04L 9/3247; H04L 9/30; H04L 63/0428; H04L 63/0861; H04L 63/102; H04L 63/10; H04L 2209/38
See application file for complete search history.

(56) References Cited

U.S. PATENT DOCUMENTS

| | | |
|---|---|---|
| 8,023,648 B2 | 9/2011 | Seppanen |
| 9,049,010 B2 | 6/2015 | Jueneman et al. |
| 2004/0181749 A1* | 9/2004 | Chellapilla ........ G06K 9/00449 715/222 |
| 2006/0095376 A1 | 5/2006 | Mitchell et al. |
| 2006/0123243 A1 | 6/2006 | Shimosato et al. |
| 2008/0209516 A1 | 8/2008 | Nassiri |
| 2010/0185847 A1 | 7/2010 | Shasha et al. |
| 2010/0205660 A1 | 8/2010 | Griffin |
| 2012/0293599 A1 | 11/2012 | Norlin et al. |
| 2015/0095999 A1 | 4/2015 | Toth |
| 2015/0096000 A1 | 4/2015 | Sharif et al. |
| 2015/0128240 A1 | 5/2015 | Richards et al. |
| 2015/0310424 A1 | 10/2015 | Myers |
| 2015/0356523 A1 | 12/2015 | Madden |
| 2015/0379510 A1 | 12/2015 | Smith |
| 2016/0027229 A1 | 1/2016 | Spanos et al. |
| 2016/0162897 A1 | 6/2016 | Feeney |
| 2016/0269402 A1 | 9/2016 | Carter et al. |
| 2016/0275461 A1 | 9/2016 | Sprague et al. |
| 2016/0283920 A1 | 9/2016 | Fisher et al. |
| 2016/0306982 A1 | 10/2016 | Seger, II et al. |
| 2016/0323109 A1 | 11/2016 | McCoy et al. |
| 2016/0328713 A1 | 11/2016 | Ebrahimi |
| 2016/0358158 A1 | 12/2016 | Radocchia et al. |
| 2017/0046689 A1 | 2/2017 | Lohe et al. |
| 2017/0048217 A1 | 2/2017 | Biggs et al. |
| 2017/0091397 A1 | 3/2017 | Shah |
| 2017/0103472 A1 | 4/2017 | Shah |
| 2017/0134375 A1 | 5/2017 | Wagner |
| 2017/0161439 A1 | 6/2017 | Raduchel et al. |
| 2017/0180128 A1 | 6/2017 | Lu |
| 2017/0232300 A1 | 8/2017 | Tran et al. |
| 2017/0236094 A1 | 8/2017 | Shah |
| 2017/0279774 A1 | 9/2017 | Booz et al. |
| 2017/0318141 A1 | 11/2017 | Gerace et al. |
| 2017/0330174 A1 | 11/2017 | Demarinis et al. |
| 2018/0152304 A1* | 5/2018 | Ebrahimi .............. H04L 9/3297 |

FOREIGN PATENT DOCUMENTS

| | | | |
|---|---|---|---|
| EP | 3073670 A1 | 9/2016 | |
| WO | 2016128567 A1 | 8/2016 | |
| WO | 2016128569 A1 | 8/2016 | |
| WO | 2016170538 A1 | 10/2016 | |
| WO | 2017044554 A1 | 3/2017 | |
| WO | 2017066002 A1 | 4/2017 | |
| WO | WO-2017066002 A1 * | 4/2017 | ........... G06Q 20/385 |

OTHER PUBLICATIONS

Australian Examination Report, dated Oct. 19, 2018, issued in corresponding Australian Application No. 2017352545, 7 pages.
Pamela Morgan, "Using Blockchain Technology to Prove Existence of a Document", Brave New Coin, http://bravenewcoin.com/news/using-blockchain-technology-to-prove-existence-of-a-document/, Dec. 5, 2014, 9 pages.
BitScan, How to Establish Proof-of-Existence on the Bitcoin Blockchain, http://bitscan.com/articles/how-to-establish-proof-of-existence-on-the-bitcoin-blockchain, Nov. 10, 2015, 4 pages.
Jacobovitz, "Blockchain for Identity Management", https://www.cs.bgu.acil/-Frankel/TechnicalReports/2016/16-02.pdf, Dec. 2016, 19 pages.
Hammudoglu et al., "Portable Trust: biometric-based authentication and blockchain storage for self-sovereign identity systems", https://arxiv.org/pdf/1706.03744.pdf, Nov. 14, 2017, 6 pages.
Lewison et al., "Rich Credentials for Remote Identity Proofing", Revised Jul. 10, 2017; first version, https://pomcor.com/techreports/RichCredentials.pdf, Oct. 15, 2016, pp. 1-64.
Milanovic, "The next revolution will be reclaiming your digital identity", https://techcrunch.com/2017/10/17/the-next-revolution-will-be-reclaiming-your-digital-identity/, Oct. 17, 2017, 16 pages.
Xia et al., "BBDS: Blockchain-Based Data Sharing for Electronic Medical Records in Cloud Environments", http://www.mdpi.com/2078-2489/8/2/44/htm, published Apr. 17, 2017, 28 pages.
International Search Report and Written Opinion of the International Searching Authority, dated Mar. 8, 2018, in corresponding International Application No. PCT/US17/067177, 10 pages.
Swan M., Blockchain: Blueprint for a new economy. [online] "O'Reilly Media, Inc.", published Jan. 24, 2015. Retrieved on Feb. 26, 2018 (Feb. 26, 2018) retrieved from the Internet<URL:http://w2.blockchain-tech.net/blockchain/blockchain-by-melanie-swan.pdf> (p. 16, 17, 24-25, 62).
Van der Elst et al., "Bringing the AGM to the 21st Century: Blockchain and Smart Contracting Tech for Shareholder Involvement," retrieved from the Internet: <http://www.ecgi.global/sites/default/working_papers/documents/3582017.pdf,> 3ublished Jun. 2017, 31 pages.
World Economic Forum / Deloitte, "The future of financial infrastructure—An ambitious look at how blockchain can eshape financial services," retrieved from the Internet: <http://www3.weforum.org/docs/>NEF_The_future_of financial_infrasructure.pdf, published Aug. 2016, 130 pages.
Wright et al., Decentralized Blockchain Technology and the Rise of Lex Cryptographia, Retrieved from the Internet: http://www.the-blockchain.com/docs/Decentralized%20Blockchain%20Technology%20And%20The%20Rise%200f% <http://www.the-blockchain.com/docs/Decentralized%20Blockchain%20Technology%20And%20The%20Rise%200f%> 20Lee/020Cryptographia.pdf, Mar. 12, 2015, 58 pages.
Global Delaware Blog, "Delaware judge outlines how blockchain technology can solve stockholder voting issues", etrieved from the

(56) References Cited

OTHER PUBLICATIONS

Internet: <https://global.delaware.gov/2016/11/01/delaware-judge-outlines-how-blockchain-.echnology-can-solve-stockholder-voting-issues/,> Nov. 1, 2016, 4 pages.
Australian Examination Report, dated Feb. 15, 2019, issued in corresponding Australian Application No. 2017352545, 5 pages.
European Extended Search Report, dated Mar. 1, 2019, issued in corresponding European Application No. 17875067.5, 10 pages.
United Kingdom Examination Report, dated Jan. 14, 2019, issued in corresponding Great Britain Application No. GB1809205.6, 6 pages.
Great Britain Examination Report, dated Sep. 7, 2018, issued in corresponding Great Britain Application No. GB1809205.6, 5 pages.
Chinese Office Action (with English translation) dated Feb. 3, 2019 in corresponding Chinese Application No. 201780004117.9, 7 pages.

\* cited by examiner

SYSTEMS AND METHODS FOR DIGITAL IDENTITY MANAGEMENT AND PERMISSION CONTROLS WITHIN DISTRIBUTED NETWORK NODES

CROSS-REFERENCE TO RELATED APPLICATIONS

This application claims priority to U.S. patent application Ser. No. 15/845,662, filed Dec. 18, 2017, which in turn claims priority to U.S. Provisional Application Ser. No. 62/455,471, filed on Feb. 6, 2017, each of which is hereby incorporated by reference in its entirety.

TECHNICAL FIELD

This application relates generally to distributed database within distributed network nodes and more specifically to digital identity management and permission controls within the distributed network nodes.

BACKGROUND

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database have to recreate and redistribute the blockchain faster than the honest network nodes, which, in most cases, is computationally infeasible. In other words, data integrity is guaranteed by the virtue of multiple network nodes in a network having a copy of the same blockchain. A central trust authority is therefore not required to vouch for the integrity of the distributed database hosted by multiple nodes in the network.

Within a distributed network nodes environment, the conventional computing systems have several technical shortcomings. In other words, there are several problems that are not addressed by current blockchain technology. One problem is how to provide an identity framework to maintain the identities of blockchain entities within a blockchain. Another problem is how to provide a permissions framework integrated within the identity framework and also maintained within the blockchain. Conventional systems and technology is confined to providing digital identity and permissions in typical bi-directional client-server relationships.

SUMMARY

What is therefore desired is a system and a method for implementing digital identity and permission controls within distributed network nodes maintaining a distributed database such as a blockchain. More specifically, what is desired is blockchain based digital identity and permission controls, wherein one or more smart contracts automatically and intelligently maintain and update immutable records of digital identity and permission control.

Embodiments disclosed herein solve the aforementioned technical problems and may provide other benefits as well. Embodiments disclosed herein provide systems and methods for digital identity management and permission controls within distributed network nodes. For example, a network node may retrieve, based on an entity type and either from a blockchain or from a local database, a digital identity record template containing multiple data fields. The network node may receive information to populate the data fields, reference documents, and/or biometric information. The network node may associate the received information, reference documents, and/or biometric information with the data fields to generate a digital identity record from the digital identity record template. Within the digital identity record, the network node may store the received information and respective one directional cryptographic hashes of the reference documents and/or biometric information. The network node may store the each of the reference documents and biometric information in one or more non-blockchain repositories. The network node may set a status for each of the multiple data fields. Furthermore, based on the type of the entity and received information, the network node may set permission controls in the digital identity record. The network node may generate a digital identity record block by associating the digital identity record with one or more smart contracts, encrypt the digital identity record block with one or more encryption keys, and deploy the encrypted digital identity block to the latest valid blockchain.

In one embodiment, a computer-implemented method for generating an encrypted digital identity record in a blockchain comprises: receiving, by a network node, a request to generate a digital identity record within a blockchain for an entity, wherein the request contains an entity type of the entity; retrieving, by the network node, a digital identity record template associated with the entity type from a blockchain, wherein the digital identity record template comprises multiple data fields including mandatory and supplemental data fields; receiving, by the network node, information for at least the mandatory data fields and a reference document from a client device associated with the entity; generating, by the network node, a digital identity record for the entity by associating the received information to one or more data fields in the digital identity record template; assigning, by the network, a status identifier to the one or more data fields based on the corresponding associated information; associating, by the network node, a first data field of the one or more data fields with the reference document; generating, by the network node, a one directional cryptographic hash of the reference document; storing, by the network node, the reference document in a non-blockchain document repository; storing, by the network node, the one directional cryptographic hash of the reference document in the digital identity record in association with the first data field; setting, by the network node, permission controls for the digital identity record based on the entity type and the received information; encrypting, by the network node, the digital identity record using one or more encryption keys; generating, by the network node, a digital identity record block containing the encrypted digital identity record; and appending, by the network node, the digital identity record block to the blockchain.

In another embodiment, system for generating an encrypted digital identity record in a blockchain comprises: a plurality of distributed network nodes, each including a non-transitory storage medium storing a respective local copy of a blockchain; at least one of the plurality of distributed network nodes having a processor configured to: receive a request to generate a digital identity record within the blockchain for an entity, wherein the request contains an entity type of the entity; retrieve a digital identity record template associated with the entity type from the blockchain, wherein the digital identity record template comprises multiple data fields including mandatory and supplemental data fields; receive information for at least the mandatory data fields and a reference document from a client device associated with the entity; generate a digital identity record for the entity by associating the received information to one or more data fields in the digital identity record template; assign a status identifier to the one or more data fields based on the corresponding associated information; associate a first data field of the one or more data fields with the reference document; generate a one directional cryptographic hash of the reference document; store the reference document in a non-blockchain document repository; store the one directional cryptographic hash of the reference document in the digital identity record in association with the first data field; set permission controls for the digital identity record based on the entity type and the received information; encrypt the digital identity record using one or more encryption keys; generate a digital identity record block containing the encrypted digital identity record; and append the digital identity record block to the blockchain.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
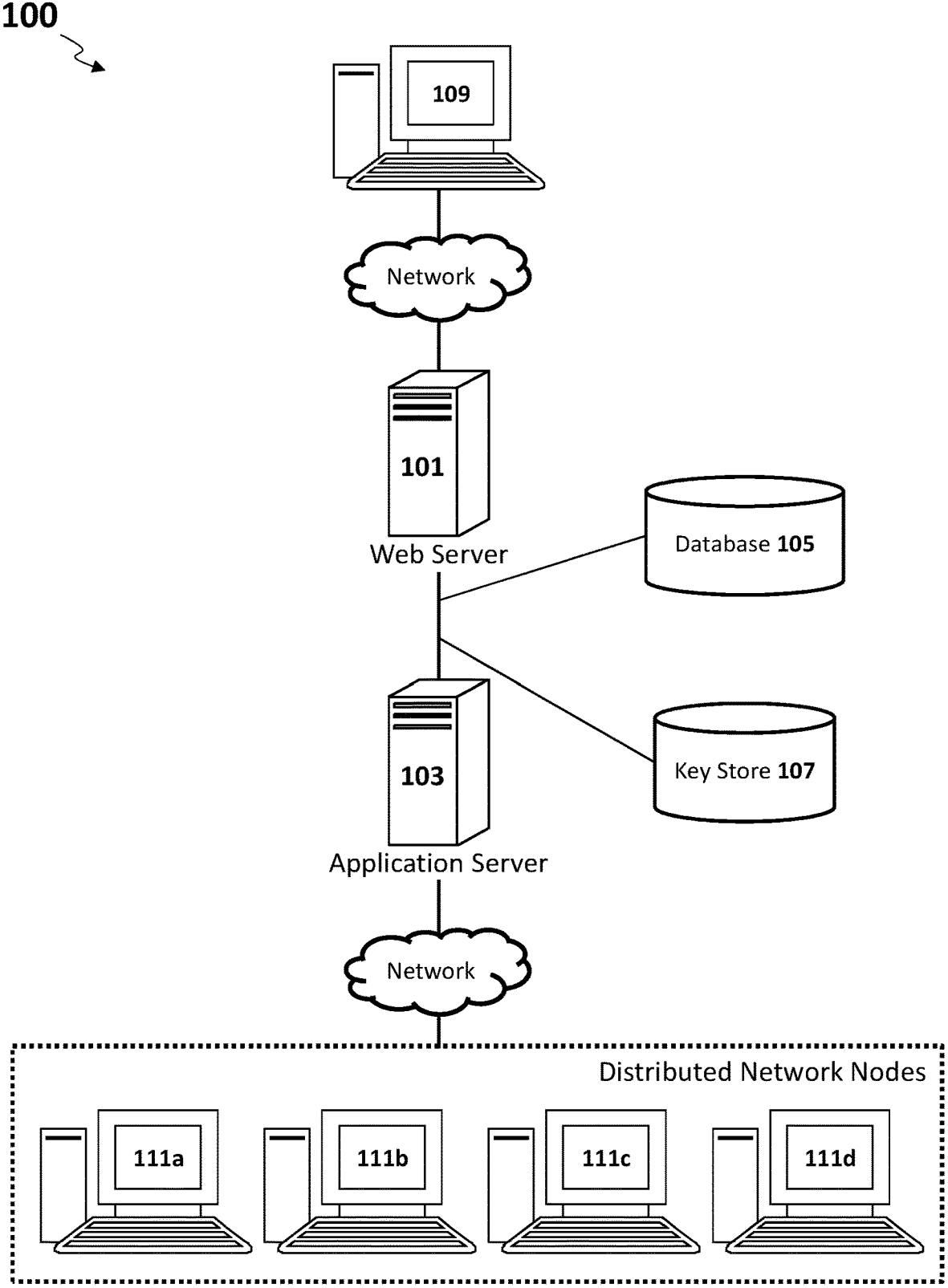
FIG. 1 shows components of an exemplary system 100 for maintaining digital identity records and associated permission controls, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein describe systems, methods, and products for providing a digital identity and integrated permission controls framework within a distributed network nodes environment. The distributed network nodes environment may maintain a distributed ledger such as a blockchain. One or more distributed network nodes may generate a digital identity record and set permission controls based on a digital record template and information received to populate the data fields of the digital record template. Alternatively, the one or more distributed network nodes may set permission controls upon the individual entity, business relationships, and/or entity type.

In some embodiments, a network node may allow an admin user (or a user with permissions) to generate a repository of digital identity templates. For example, the network node may render an admin user interface for the admin user to select, type, and compile digital identity templates to generate the repository. In some implementations, the digital identity templates may be of different types based on the type of entities associated with the respective digital identity templates. A digital identity template database record may contain both mandatory and supplemental data fields. The network node may have to have information for the mandatory fields to generate a corresponding digital identity record but may be able to receive information for the supplemental data fields after the generation of the digital identity record.

In some embodiments, a network node may generate a globally unique random digital identity reference for an entity, wherein the random digital identity reference is recognizable within the distributed network nodes. The distributed network nodes may not replicate or reuse a digital identity reference to ensure that a digital identity reference for a participating entity remains unique. The network node may generate the digital identity reference based on a request from an admin user, other user, and/or one or more programs being executed within the distributed network nodes.

In some embodiments, a network node may allow an admin user (or a user with permissions) to generate individual digital identity record using a digital identity template and a digital identity reference. The network node or the admin user may select the digital identity template based on the type of the entity associated with the digital identity record. Furthermore, the network node may retrieve the associated digital identity reference from the blockchain or a non-blockchain database. The network node may store the digital identity record with the smart contract in the blockchain. The digital identity record may be unique and the distributed network nodes may use the digital identity record for multiple types of functionalities within the distributed network nodes. In some embodiments, one or more smart contracts may automatically and intelligently generate the digital identity record based on a received request with minimal manual involvement.

In some embodiments, a network node may assign separate statuses to separate data fields within the digital identity record. For example, the network node may assign a verified status to a first data field and assign a non-verified status to a second data field. The network node may assign the statuses based on receiving request from an admin user or a user with relevant permissions. In some instances, the network node may receive an API request to edit the status from a trusted third party (e.g. a registration system computer). In these instances, the network node may record on the blockchain the information on the trusted third party that transmitted the API request to the network node. In some instances, the network node may assign and/or update the assigned status based on execution of one or more smart contracts. In some instances, the network node may update a status based on a user initiated or a third party system initiated digital signature using a private cryptographic key.

In some embodiments, an identity record stored in a blockchain may require a reference to a document that is associated with a data field of the identity record. For example if the identity record is of a natural person, a scan of the person's passport may have to referenced for verifying vital information such as a name or date of birth. In other words, the name and/or date of birth field of the identity record may have to have the scan of the passport as a reference document. In such a case, the network node may store a document file (for example, a PDF copy of the passport) in a document repository and generate a hash value for the document using a one directional mathematical hashing function. The network node may upload the hash value in the blockchain and store the hash value of the document in association with the relevant data filed of the identity record. The unique document hash value generated within the identity record in the blockchain may evidence the immutability of the document that is being referenced. In this way, the network node may ensure the immutability of the document even if the document is not stored in the blockchain itself. In some implementations, the network node may retrieve identity information from a trusted third party system. For example, if the network node receives a passport number, the network node may query a trusted third party database to retrieve, for example, date of birth and place of birth.

In some embodiments, an identity record may be of a natural person, and the network node may associate biometric information with a data field of the identity record. More specifically, a data field in the identity record may require a reference to the person's biometric mathematical hash value information that can be used for verification purposes. The network node may receive biometric information captured by a biometric reader such as a fingerprint reader or a retina scanner. The network node may generate a one directional mathematical hash value from the biometric information, store the biometric information in a local repository, and store the one directional mathematical hash value of the biometric information on the blockchain in association with the data field. In some instances, the network node may implement security by using, in addition to the biometric information, a private passcode or a random unique passcode. The network node may use the biometric hash value for verifying a person or for any other purpose wherein the user inputs biometric information.

In some embodiments, the distributed network nodes may maintain permission controls within the blockchain. For example, in a digital identity record, there may be a data field containing the permission controls of the entity identified by the digital identity record. The permission controls may indicate the access rights of the entity for information stored in the blockchain and other associated information. The permission controls may further indicate the entity's permissions to initiate blockchain based events.

In some embodiments, a digital identity record may be within a smart contract. For example, the distributed network nodes may host a block having an identity smart contract delimiting different functionalities associated with an identity. Each time a network node creates a digital identity record, the network node may retrieve the identity smart contract or a portion thereof; and store the digital identity record within the identity smart contract. In other words, a digital identity record block may have executable codes of a smart contract and the data fields containing information for the digital identity record. In other embodiments, the distributed network nodes may associate the digital identity record with one or more smart contracts stored within the blockchain. In these embodiments, a network node may record the block addresses for the one or more smart contracts within the digital identity record block such that the digital identity record block may invoke the one or more smart contracts when required.

In some embodiments, the distributed network nodes may link multiple digital identity records. For example, a first digital identity record may be linked to a second digital identity record. In some instances, the second digital identity record may be hierarchically below the first digital identity record. In these instances, the first digital identity record may perform as a master digital identity record for the second digital identity record, that is, a network node may generate the second digital identity record such that the second digital identity record inherits one or more data fields from the first digital identity record. Such linkages and hierarchical relationships may be governed by smart contracts stored within the blockchain.

In some embodiments, the distributed network nodes may maintain the privacy of digital identity record database using encryption techniques, that is, the digital identity records may be encrypted prior to being uploaded in the blockchain. The network nodes may allow access to the encrypted digital identity records based on the permissions stored in the respective digital identity records. For example, a network node may provide an entity identified by a digital identity record with a decryption key based upon the permission controls stored in the digital identity record. In some instances, the network node may encrypt a first portion of the digital identity record with a first encryption key and a second portion of the digital identity record with a second encryption key. For example, the network node may use the first encryption key to encrypt the identity components and use the second encryption key to encrypt the permission control components within the digital identity record. Furthermore, the distributed network nodes may also allow concealing of data to meet the regulatory requirements of various jurisdictions. For example, network nodes may encrypt data stored on the blockchain using an encryption key. A user with relevant permissions may instruct a network node to destroy the encryption key and access to the data is forever lost because the data, without the encryption key, may be indecipherable.

Although the aforementioned embodiments describe a network node implementing the various functionalities, one having ordinary skill in the art should understand a single network node was included only for brevity, and should not be limiting. Multiple network nodes within the distributed network nodes and other associating computing systems implementing these functionalities should be considered to be within the scope of this disclosure.

FIG. 1 shows components of a digital identity and permission control management system 100, according to an exemplary embodiment. The exemplary system 100 may comprise a webserver 101, an application server 103, databases 105, a key store 107, a client device 109, and distributed network nodes 111. Aspects of the system 100 may be configured to employ and manage a system blockchain, sometimes referred to in the art as a "distributed ledger," and may include blockchain-based distributed ledger software (e.g., Hyperledger, Ethereum, Openchain, TerraLedger). In some implementations, the system blockchain may be a private party blockchain. The system blockchain may operate as a distributed database that stores data records associated with entities and transaction documents, where the data records stored on the system blockchain may be blocks of data that are hosted on distributed network nodes 111. The data records associated with the entities may include digital identity records and permission controls. In some instances, the system 100 may store the permission controls within the digital identity records. It should be appreciated that the data stored in records within system databases 105 may vary from the data stored in blocks of the system blockchain hosted on network nodes 111.

A webserver 101 may host a website accessible to end-users, where the content presented via the various webpages may be controlled based upon each particular user's role and/or permissions. For example, a user may be an admin user with more permission compared to a normal user. The system 100 may store the permission controls for the admin user or any other user in the respective digital identity record. The webserver 101 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single webserver 101, one having skill in the art would appreciate that some embodiments the webserver 101 may include any number of computing devices operating in a distributed computing environment.

The webserver 101 may execute software applications configured to host a website (e.g., Apache®, Microsoft IIS®), which may generate and serve various webpages to client devices 109. The website may be used to generate and access data stored on a system database 105 or in a blockchain hosted by distributed nodes 111 of the system 100. In some implementations, the webserver 101 may be configured to require user authentication based upon a set of user authorization credentials (e.g., username, password, biometrics, cryptographic certificate). In such implementations, the webserver 101 may access a system database 105 configured to store user credentials, which the webserver 101 may be configured to reference in order to determine whether a set of entered credentials (purportedly authenticating the user) match an appropriate set of credentials that identify and authenticate the user. Similarly, in some implementations, the webserver 101 may generate and serve webpages to a client device 109 based upon a user role within the system 100 (e.g., administrator, investor, investment promoter). In such implementations, the user role may be defined by data fields in user records stored in the system database 105, and authentication of the user and user role may be conducted by the webserver 101 by executing an access directory protocol (e.g. LDAP). The webserver 101 may then be instructed to generate webpage content, access or generate data stored in the system database 105, and access or generate data stored in the blockchain instances, according to the user role defined by the user record in the system database 105.

In some implementations, the system blockchain may include permission controls defining a user's role within the system 100. The system blockchain may include a block with a smart contract containing permission controls that define the user's role within the system. For example, the smart contract, through the permission controls, may define the user to be a system administrator (that is, an admin user). As another example, the permission controls may define the level of authorization for non admin user to access information stored in the blockchain or initiating a blockchain based functionality. In a private equity context, the blockchain based functionality may include initiating capital calls, uploading documents to the system 100, and/or other functionalities. The system 100 may store the permission controls within a respective user's digital identity record or in association with the respective user's digital identity record. Although the descriptions above and below describe a user and user's digital identity record and permission controls, one having ordinary skill in the art should understand that this description is applicable to non-human entities such as bank servers or other corporation servers having a digital identity record and permission controls within the system 100. In other words, the system 100 may maintain the digital identity and permission controls regardless of whether or not the associated entities are human users or non-human computing systems.

An application server 103 may generate, access, and update blockchain instances hosted on the network nodes 111, according to instructions received from a client device 109 via a webserver 101. The application server 103 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single application server 103, one having skill in the art would appreciate that in some embodiments the application server 103 may include any number of computing devices operating in a distributed computing environment. It would also be appreciated that although the application server 103 is shown in FIG. 1 as being a separate device from a webserver 101, in some embodiments the webserver 101 and the application server 103 may be the same device. Furthermore, one having ordinary skill in the art understands that one or more of the client device 109, the webserver 101, databases 105, key store 107, and the application server 103 may be a part of a network node of the distributed network nodes 111.

Software executed by the application server 103 may provide blockchain services to users interacting with the application server 103 via the webserver 101. The application server 103 may update and query the record in the system database 105 according to the instructions received from the client device 109. The application server 103 may then generate blocks for the system blockchain, where the blocks contain data from the records of the system database 105 and/or data records received from the users. The application server may then update a local instance of the system blockchain, and subsequently instruct network nodes 111 to update the instances of the system blockchain stored locally on each of the network nodes 111. Each new block may be generated with a timestamp or other data that links the new block with existing blocks on the blockchain. As an example, when the application server 103 generates a new digital identity record, the application server 103 may then generate a new block containing the digital identity record and an address for the new block based upon a one directional cryptographic hash of one or more data fields of the digital identity record. The application server 103 may then append the new block in the system blockchain within the local instance of the blockchain stored in the application server 103. The application server 103 may then transmit the new block to each respective network node 111. The network nodes 111, in turn, may update the local instances of the blockchain stored on each of the network nodes 111. In other implementations, the application server 103 may transmit the blockchain or portions thereof to the network node 111, and the network nodes may accordingly replace the local instances of the system blockchain or portions thereof using the transmission received from the application server 103.

In some embodiments, the system 100 may store a digital identity record for a user or an entity within the system blockchain. To do so, the system 100 may allow an admin user to generate digital identity templates of different types based on the entity. The template may include mandatory data fields and supplemental data fields. The system 100 may store the templates within the system blockchain and/or in the databases 105. When the system 100 receives a request to generate a digital identity record for an entity, the system 100 may retrieve a digital identity template, either from the system blockchain or from the databases 105, based on the type of the entity. The system 100 may generate a digital identity record based upon the respective digital identity template. The system 100, through one or more network nodes 111, may prompt the entity to enter the information required for data fields in the generated digital identity record. Furthermore, one or more of the data fields of the digital identity record may have an independent status, and the system 100 or a trusted third party server may update the status of the digital identity record.

In addition, a data field within the digital identity record may be associated with a reference document. For example, if the aforementioned entity is a natural person, the reference document may be a scan of a passport of the person and the name data field may reference the scan of the passport. The system 100 may store the scan of the passport in the databases 105, and generate a one directional cryptographic hash of the scan of the passport. Instead of saving the entire file of the scan of the passport in the blockchain, the system 100 may store the cryptographic hash of the file in association with the name data field. This saving protocol allows for immutability of a document file that is not saved within the blockchain but on a non blockchain data repository such as the databases 105.

In some implementations, the system 100 may support a biometric identity verification of a user. In these implementations, the system 100 may receive biometric data of a user associated with a digital identity record. The biometric data may include data captured by biometric sensors such as a fingerprint sensor or retina scanner. The system 100 may store the biometric data in the databases 105 and generate a one directional cryptographic hash of the biometric information. The system 105 may store the cryptographic hash of the biometric data in association with the digital identity record.

In operation, when a user or a smart contract being executed instructs the application server 103 to conduct a transaction requiring a query of the blocks of the blockchain, the application server 103 may conduct a poll of the network nodes 111 to identify the queried data, based on the hash values identifying the blocks, and then determine whether the data within the identified blocks is accurate. The application server 103 may then await a response from a predetermined quorum of network nodes 111 to confirm the data in the blocks; the application server 103 may then proceed with a processing transaction using the data blocks of the blockchain, provided that a predetermined threshold number of network nodes 111 indicate that the blocks at issue match the blocks of the instance stored locally on each of the network nodes 111. In some implementations, the application server 103 may transmit a request to the network nodes 111 to respond with the latest blockchain stored by each network node 111. Once the application server 103 receives the blockchains from the respective nodes 111, the application server 103 may compare the received blockchains with the local copy of the blockchain. If a threshold number of blockchains match each other, the application server 103 may determine that the integrity of the blockchain has not been compromised. The threshold may be set by an admin user with appropriate authority based on the criticality of the data stored in the blockchain. For example, a blockchain with more critical data may be associated with a higher threshold than a blockchain with less critical data.

The application server 103 may generate block addresses for data to be retrieved from blockchain instances of the system blockchain. Machine-readable computer files containing various forms of documents (e.g., PDF, DOC, XLS) may be uploaded to the application server 103 via a webserver 101, or otherwise stored into a system database 105, after which the application server 103 may generate a hash value of the document, where the application uses the hash value or other identifier value to reference the file from a system database 105. The application server 103 may then generate the block address for the file by generating a hash of the document and a hash value of the immediately preceding block data or block address of the system blockchain. This block address may then be stored into the system database 105 in a document record along with the file and any number of additional data field entries related to the computer file. In operation, the application server 103 or network nodes 111 may reference the block of the blockchain containing the file according to the block address. The application server 103 may generate additional blocks and corresponding block addresses on the system blockchain in a similar manner—e.g., generating a hash value for a block containing user data and then generating a new block address using the block address of the preceding block. One having skill in the art will appreciate that block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain smart contracts, which may be executable coded scripts that instruct the application server 103 and/or network nodes 111 to perform predetermined processes when certain conditions, as indicated by the smart contract, are satisfied. In some instances, these processes instruct the application server 103 and/or network nodes 111 to generate a new block on the blockchain, often superseding and/or updating the information found in existing blocks in the system blockchain.

For example, in some implementations, a smart contract may be employed by the system 100 to control user access to machine-readable computer files stored on the system blockchain and/or in a system database 105. The smart contract may comprise code functioning logically as a matrix table for user permissions that associates users or user roles with documents contained within the computer files stored in the system database 105. In such implementations, the smart contract may comprise machine-readable software code that includes instructions for the application server 103 and network nodes 111, and, in some cases, block addresses for blocks on the system blockchain for blocks containing a digital identity record, user role rules in the system database 105 or application server, and/or document records in the system database 105, among other types of data. When the application server 103 receives a document request from a user device 109, to determine whether the user may access the requested document, the application server 103 may reference a block address containing the digital identity record associated with the user that may contain the permission rules or user role, and/or a block address for the smart contract containing the permissions rules. The application server 103 is instructed by the smart contract whether to retrieve the document from the system database 105 according to the user role, or other user identifier mapping the user or user role to the requested document. The application server 103 may retrieve the document file from the system database 105 upon determining from the smart contract permission data that the user or user role is associated with the document requested.

As mentioned, some embodiments may comprise a system database (or, a database) 105 hosted on one or more computing devices, wherein the system database 105 may store data records associated with various aspects of the application services offered to end users. Non-limiting examples of what may be stored in the system database 105 may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), parsed portions of such computer files, or metadata associated with computer files; and application data that may include software instructions executed by an application server 103 or data used by the such applications executed by the application server 103. The system database 105 may be hosted on any number computing devices comprising a non-transitory machine-readable storage medium and capable of performing the various tasks described herein. As shown in FIG. 1, the system database 105 may be accessed by a webserver 101 and/or an application server 103 via one or more networks. But one having skill in the art would appreciate that the system database 105 may be hosted on the same physical computing device functioning as a webserver 101 and/or functioning as an application server 103.

In some embodiments, the system 100 may store a digital identity record for a user or an entity within the system blockchain. To do so, the system 100 may allow an admin user to generate digital identity templates of different types based on the entity. The template may include mandatory data fields and supplemental data fields. The system 100 may store the templates within the system blockchain and/or in the databases 105. When the system 100 receives a request to generate a digital identity record for an entity, the system 100 may retrieve a digital identity template, either from the system blockchain or from the databases 105, based on the type of the entity. The system 100 may generate a digital identity record based upon the respective digital identity template. The system 100, through one or more network nodes 111, may prompt the entity to enter the information required for data fields in the generated digital identity record. Furthermore, one or more of the data fields of the digital identity record may have an independent status, and the system 100 or a trusted third party server may update the status of the digital identity record. The digital identity record may include one or more one directional hashes of one or more verifying documents, such as a scanned copy of passport verifying name and date of birth. Furthermore, the digital identity record may include one or more directional cryptographic hashes of biometric information of the user such as fingerprint data, retina scan data, and/or any other type of biometric information.

In some embodiments, document records stored on the system database 105 may comprise a data field containing document-identifying hash values generated by an application server 103 according to a hashing algorithm implemented by a system blockchain, when a new document record containing a machine-readable computer file (e.g., PDF, DOC, XSL), such as transaction documents, is generated or updated. The hash value may be generated using one or more data fields that describe the computer file, which may be uploaded by a user via a website portal or pulled from the document record within the system database 105. The hash value may be a unique identifier for the particular document record, and may be used by various computing devices of the system 100, such as the system database 105, to reference the computer file or metadata describing the computer file, which may be stored in the system database 105 and/or on blocks of the system blockchain that is hosted on network nodes 111.

A key storage database 107, sometimes referred in the art as a "high security module," "key appliance," "certificate authority," or the like, may be a computing device configured to manage and distribute encryption keys and cryptographic certificates to various computing devices in the system 100 according to predetermined roles and rules. In some implementations, encryption keys may be used for authentication of users when users log into a website hosted on a webserver 101. In some implementations, encryption keys may be used to encrypt the data blocks of the system blockchain. Additionally or alternatively, encryption keys may be used to confirm, or "sign," data transfers to confirm to a data transfer recipient that the data originated from a known party. Encryption keys may be also be used by users at an application level to apply a digital signature to a document or contract, which, in some cases, may trigger instructions from script code of a smart contract stored on the system blockchain.

The key storage database 107 may be hosted on any number computing devices comprising a non-transitory machine-readable storage medium and capable of performing the various tasks described herein. As shown in FIG. 1, the key storage database 107 may be accessed by a webserver 101 and/or an application server 103 via one or more networks, but the key storage database 107 may also be accessed by a user device 109 and network nodes 111 to retrieve or confirm encryption keys or encryption key signatures. Moreover, one having skill in the art would appreciate that the key storage database 107 may be hosted on the same physical computing device functioning as a webserver 101 and/or an application server 103.

Network nodes 111 may host one or more blocks of the system blockchain. A network node 111 may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 111 are described as storing blocks of the blockchain in FIG. 1, other computing devices, such as an application server 103, may host blocks of the blockchain. Each network node 111 locally stores an instance of the system blockchain in the storage medium of the system blockchain, and further executes a software application that instructs the network node 111 on generating and querying blocks within the locally stored blockchain instance.

In operation, a network node 111 may generate new blocks on a locally stored instance of the system blockchain according to data received from an application server 103 or other network nodes 111. In some instances, the application server 103 may update a local instance of the blockchain stored on the application server 103, and then instructs one or more of the network nodes 111 to update each blockchain instance stored on such network nodes 111. Moreover, the application server 103 may query the blocks of the system blockchain according to a block address stored in the system database 105. When the application server 103 executes the query of the blocks on the system blockchain, the application server 103 may poll the network nodes 111 to determine the most recent data on the system blockchain. The application server 103 may be confident that the data at block is the desired data according to a voting mechanism encoded within the blockchain software executed by the network nodes 111. Each network node 111 may receive the query for the block and block address, and return a response to the application server 103 indicating whether the block address contains the desired data. In this way, the application server 103 may be certain that data in the blockchain is resistant to corruption, as each blockchain instance on each network node 111 would need to be corrupted in the same way so that each block address is corrupted in the same way. Furthermore, the system blockchain may also disallow the application server 103 from acting on obsolete data. For instance, a network node 111a may execute a smart contract that instructs the network node 111a to generate a second block that updates data records in a first block on the local blockchain instance. In other words, the data records in the first block may be obsolete being superseded by the data records in the second block. After the update, the network node 111a may then accordingly instruct one or more remaining network nodes 111b, 111c and the application server 103 to update the respective local blockchain instances on those nodes 111b, 111c and application server 103. However, the application server 103 may not have updated its local blockchain instance before the application server 103 receives a data query or instruction for the updated data records from the user device 109 or a smart contract. Prior to responding to the query, the application server 103 may use the voting mechanism to ascertain the latest valid blockchain. As the latest valid blockchain may contain the updated data record, such voting mechanism may protect against the application server 103 from acting on obsolete data and may keep the system blockchain resistant to data collisions.

A client device 109 may be any computing device allowing a user to interact with application server 103 via a webserver 101. The client device 109 may execute an Internet browser or local application that access the webserver 101 in order to issue requests or instructions to the application server 103 to access the system blockchain. The client device 109 may transmit credentials from user inputs to the webserver 101, from which the webserver 101 may authenticate the user and, in some implementations, determine a user role. One having skill in the art would appreciate that the client device 109 may comprise any number of input devices configured to receive any number of data inputs, including various types of data inputs allowing for authentication (e.g., username, passwords, certificates, biometrics). One having skill in the art would also appreciate that the client device 109 may be any computing device comprising a processor and non-transitory machine-readable storage medium allowing the client device 109 to perform the various tasks and processes described herein.

As an example of the client device 109 operation, the client device may execute an Internet browser that accesses a webserver 101 hosting a fund investment administration website that allows access for fund managers, administrators and investors and other third parties to a common platform for the end-to-end administration of fund investments, using the device a fund manager may initiate fund lifecycle events such as a payment request associated with a capital call from investors, and investors may use the platform to view lifecycle events such as the capital call and associated payment obligations due in relation to their investments. Using the client device 109, an investor-user may select an investment in which to invest. As the transaction proceeds, the client devices 109 of the investor-user or a promoter-user may be used to upload machine-readable computer files (e.g., PDF, DOC, XSL) containing transaction information. The computer files may be stored into document records in a document database 105, which may then be added to blocks of the system blockchain, where the blocks are accessible according to block addresses that are then stored into the document record for the particular computer file. The client device 109 may issue queries or instructions to the application server 103 via the webpages generated by the webserver 101, which then instruct the application server 103 to query the blocks on the network nodes 111, and, in some instances, perform various tasks, such as retrieving or updating a file from the system database 105.

Figure 2:
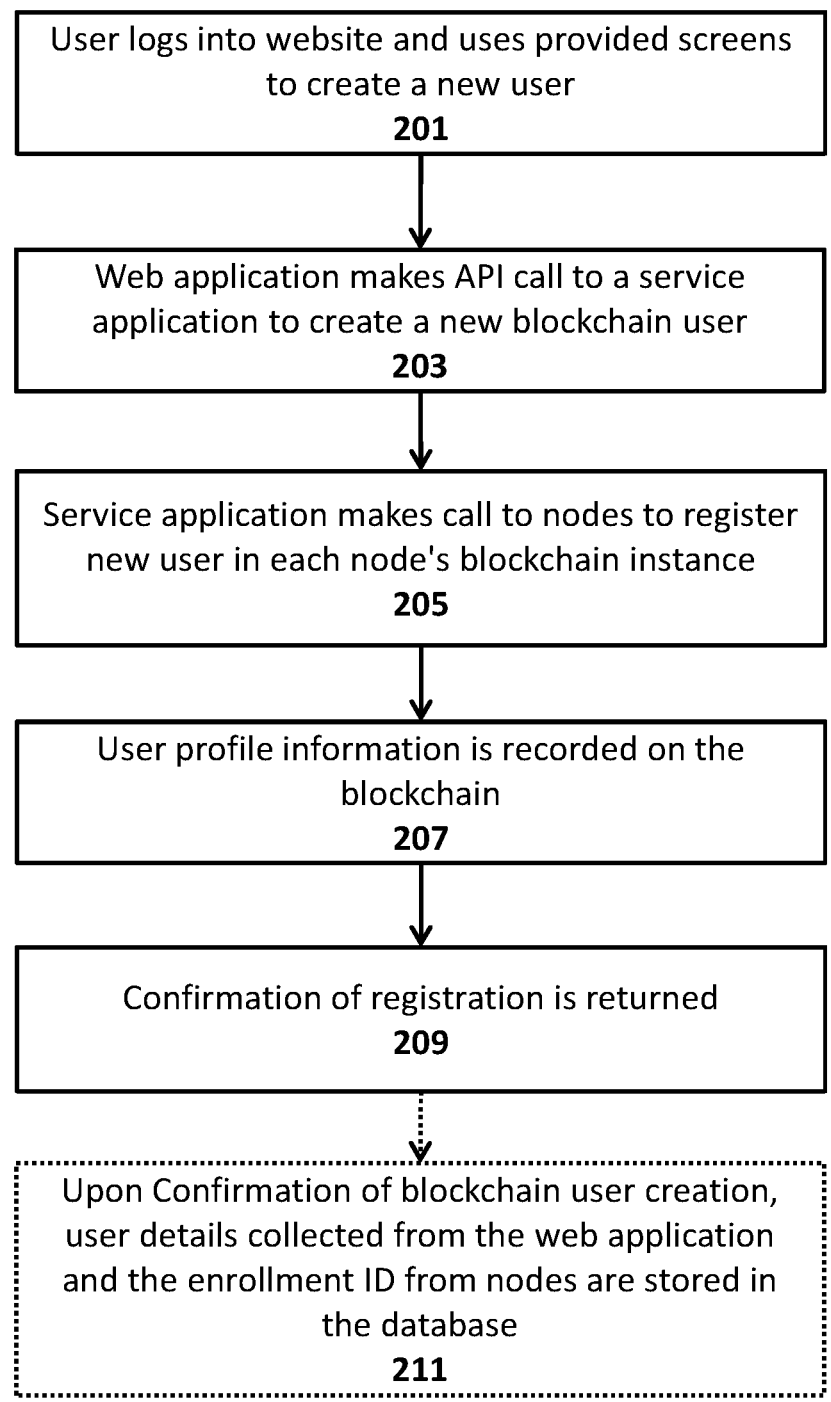
FIG. 2 shows execution of an exemplary method 200 for generating new users, according to an exemplary embodiment.

FIG. 2 shows execution of an exemplary method 200 for generating new users, according to an exemplary embodiment. The exemplary method 200 comprises steps 201, 203, 205, 207, 209, and 211, but one having skill in the art would appreciate that other embodiments may comprise additional or alternative steps, or may omit some steps altogether.

In a first step 201, an administrator user (or an admin user) logs into a website hosted on a webserver to generate a new user (e.g., investor-user, promoter-user), and uses the webpages, which may be web-based graphical user interfaces (GUIs), to create the new user in the system. The administrator may assign access rights or roles (i.e., template of access rights) to the new user, which may be stored along with a user identifier and credentials into a user record in the system database.

In a next step 203, a web-application executed by the webserver or an application server executes an application programming interface (API) call to a blockchain service application executed by the application server, instructing the application server to create a new blockchain user.

In a next step 205, the service application executed by the application server instructs one or more network nodes hosting instances of the system blockchain, to register the new user in each node's blockchain instance.

In a next step 207, the user data may be stored onto the instance of the blockchain on each of the nodes according to instructions in the service application and/or a smart contract configured to instruct the application server and/or network nodes on registering a new user. In some embodiments, the application server may poll the blockchain instances to determine whether the user record data is the most recent data by comparing the hashed data of the new user data to the user data in one or more blocks, according to the block addresses stored in the system database. In some embodiments, the application server may instruct the network nodes to update the local blockchain instances in response to each respective node indicating that there are no collisions in the user data in the new block being registered.

The application server may execute functions coded onto a smart contract stored in a block of the system blockchain.

One or more data fields of the user record may be hashed according to a predetermined hashing algorithm and then stored to the blockchain instance on the application server. In addition, the application server may generate a block address for the new user block that will be added to the user block on the system blockchain. The block address may be a hash of one or more data fields and one or more data fields of the preceding blocks. One having skill in the art will appreciate that any number of combinations of data may be used to hash the data in the user block, and that any number of fields from the user block and the preceding block may be hashed to generate the block address. The block address may then be stored into the user record within the system database. Moreover, the user rights or role may be included in the user block, indicating which computer files the user may access from the system database.

In a next step 209, each node may generate and return a confirmation of registration to the application server. In some embodiments, rather than the application server generating and storing the block address, network nodes may return the identifier (e.g., enrollment identifier, block address) to the application server, and then stored into the user record within the system database.

In an optional step 211, rather than generating the user record before registering the new user block, the application server may wait for confirmation of the new block creation to generate the block address for the user block. After generating the user block, the data and the block address may be stored into the system database.

Figure 3:
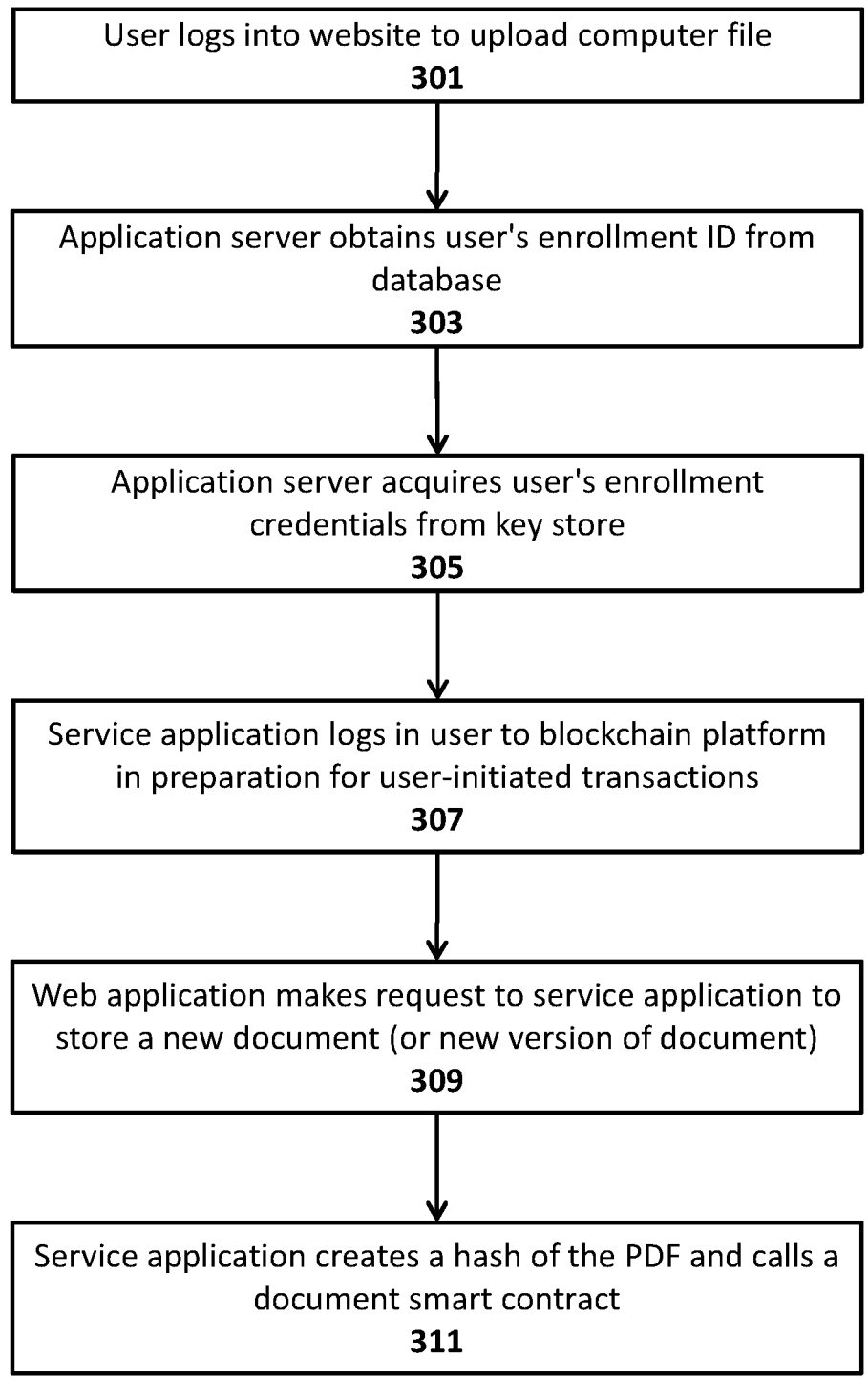
FIG. 3 shows execution of an exemplary method 300 for uploading and updating document records, according to an exemplary embodiment.

FIG. 3 shows execution of an exemplary method 300 for uploading and updating document records, according to an exemplary embodiment. The exemplary method 300 comprises steps 301, 303, 305, 307, 309, and 311, but one having skill in the art would appreciate that other embodiments may comprise additional or alternative steps, or may omit some steps altogether.

In a first step 301, a user logs into website hosted by webserver to upload a machine-readable computer file; the webserver may then authenticate the user using any number of authentication methods, such as usernames, passwords, biometric inputs, and the like.

In a next step 303, after authenticating the user, the webserver or an application server may retrieve a user identifier or block address from a user record stored within the system database.

In a next step 305, the application server may retrieve a set of credentials or cryptographic keys from a key store appliance configured to store cryptographic keys associated with users and devices in the system. Communications between various devices of the system (e.g., client device, application server, network nodes) may be encrypted according to one or more cryptographic keys, and, in some implementations, one or more data packets may be digitally signed by a cryptographic key associated with the user, for the purposes of authenticating that the source of the data packet was the user's device.

In a next step 307, the application server logs the user into the blockchain software application platform using one or more cryptographic keys and/or user-supplied credentials, in preparation for user-initiated transactions, which correspond to executable functions performed by the various devices of the system.

In a next step 309, the application server receives from the client device, via the webserver, a new or updated machine-readable computer file, or document file. The application server may then store document file into a new or existing document record within the system database. The document record may comprise any number data fields containing document data, which may include metadata defining or describing the computer file.

In a next step 311, the application server may generate and store a document identifier based upon a hash value of one or more data fields of the document record; the application server then executes a document smart contract stored on the blockchain to generate and store a document block on the system blockchain. A user identifier stored in the user record and also stored in a permissions smart contract on the blockchain may be associated with the document block according to a user identifier value in the permissions smart contract or in a permissions table stored in the system database that the permissions smart contract may reference during execution.

When a user instructs the application server to query the document file, the user may issue a document request to the webserver. The application server may determine a block address or document identifier from a permissions smart contract or system database, according to a document reference table stored in the permissions smart contract or document records stored in the system database. After determining the block address on the system blockchain for the requested document file, the application server may determine from the permissions smart contract whether the user identifier is associated with the document identifier. Upon determining that the user identifier is associated with the document identifier in the permissions smart contract, the application server may then reference and retrieve the stored document file from the document record in the system database, according to the corresponding document identifier. The application server may then transmit the document file to the user's client device, via the web server.

Figure 4:
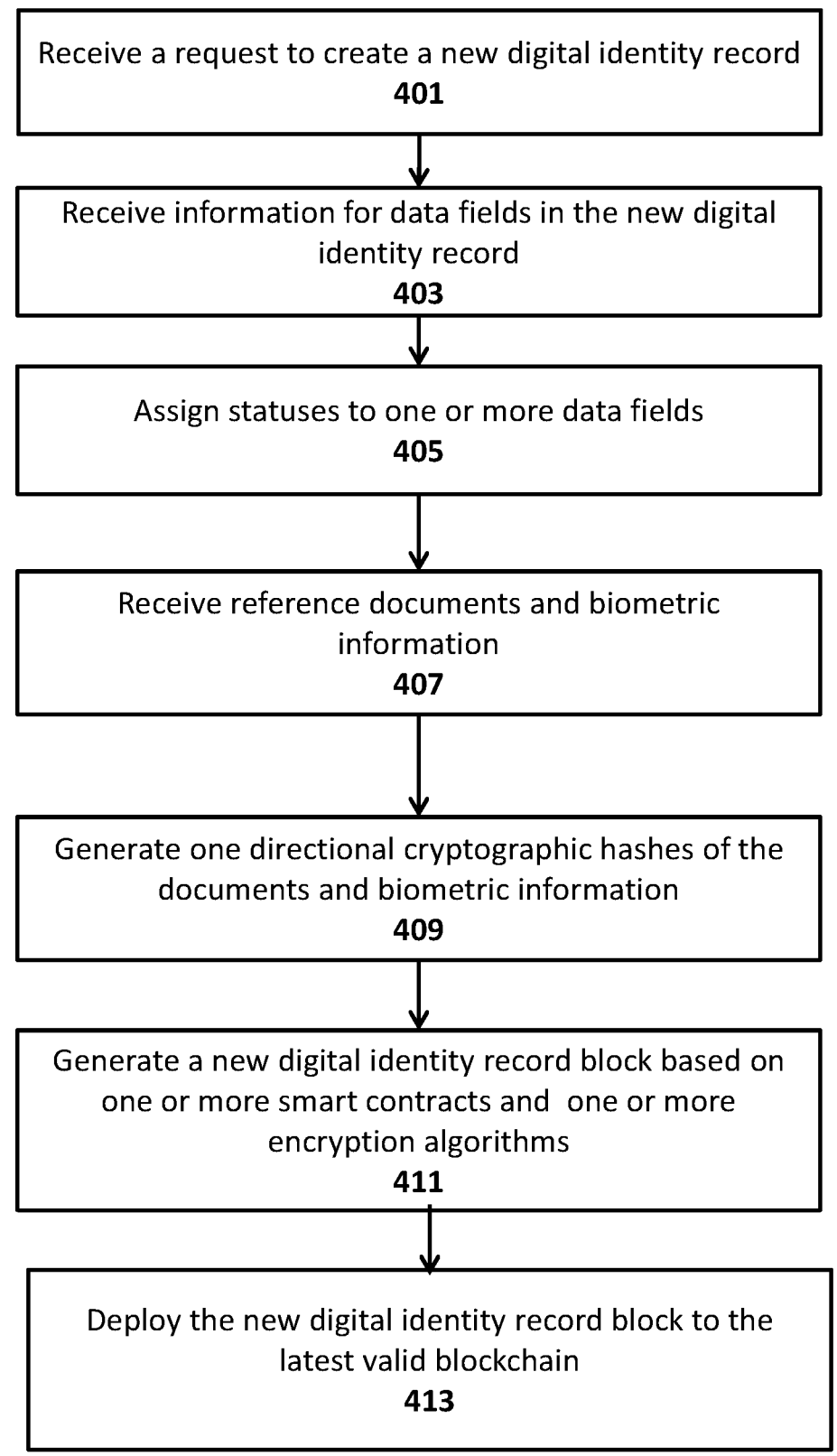
FIG. 4 shows an exemplary method 400 for generating a new digital identity record, according to one exemplary embodiment.

FIG. 4 shows an exemplary method 400 for generating a digital identity record in the blockchain, according to an exemplary embodiment. Although one or more computing systems may implement the following steps of the method 400, this description details, for brevity, an applications server implementing the steps. Furthermore, one having ordinary skill in the art should understand that the following steps are merely exemplary, and one more steps can be added or substituted, or the method 400 may skip one or more steps altogether.

In a first step 401, the application server may receive a request to create a new digital identity record. In response to the request, the application server may generate a call to a service application, which may also be hosted by the application server or other application servers, to create a new digital identity record. The application server may create the call based on an administrative user's (also referred to as an admin user) request to create a new digital identity record. To generate such request, the administrative user may log into a web application hosted by the application server, and interact with one or more elements of a provided interface. For example, the application server may provide a graphical user interface with dialog boxes, buttons, or other selectable graphical interface tools for the administrative user to interact with and generate the request. Alternatively, application server may provide a command line interface such that the administrative user may type a script, which when executed generates the request.

The permissions for the administrative user may be stored within the blockchain. In operation, when the administrative user logs into the web application hosted by the application server, the application server may retrieve the permissions block associated with the administrative user from the blockchain. The permission block may contain a smart contract and the application server may execute the smart contract such that the administrative user is provided access to the interface generated by the application server to generate the request to create the new digital identity record. In some implementations, the permission controls for the admin user may be stored in a digital identity record for the admin user.

In some implementations, the administrative user, in the request to generate the new digital identity record, may indicate the type of entity for which the digital identity record is required. The application server may either a local database or a block in the block. In these implementations, the application server may include the type of the entity in the call to the service application such that the service application may select a digital identity template based on the type of entity. In other implementations, the administrative user may include an identification of the template in the call. The service application may select the digital identity template from a repository of digital identity templates stored either in the blockchain or stored within a non-blockchain repository. The repository of digital identity templates may have been generated by an admin user or by one or more network nodes based on executing one or more smart contracts.

One having ordinary skill in the art should understand that the service application may be implemented by the application server to interface with a blockchain and the smart contracts stored thereon. In some instances, the service application may be implemented by a different server than the application server. There may be a plurality of calls between other modules within the application server and other servers to achieve the functionality of these steps. Although the service application may be different from the application server in some instances, the functionality of the service application may be attributed to the application server in other instances. The details below, therefore, for brevity describe the application server implementing the various steps; even though a separate service application may be performing a portion of these steps.

Furthermore, one having ordinary skill in the art also should understand that an admin user generating the request is merely exemplary, and other intelligent, automated processes should be considered within the scope of the invention. For example, a network node may execute a smart contract upon which the smart contract generates the request for generating a new digital identity record.

In a next step 403, the application server may receive information for data fields in the new digital identity record. The new digital identity record may have a plurality of data fields as containers to various pieces of information for the new digital identity record. Non-limiting examples of the data fields include name, company name, permission controls, relationships with other entities, and reference documents. Some of the data fields may be mandatory and the application server may have to receive the information for these data fields to generate the new digital identity record in the first place. Some of the data fields may be supplemental and the application server may generate the new digital identity record without information for these data fields. As mentioned above, the digital identity record may be based upon a template, and the template file may indicate to the application server as to which data fields are mandatory and which data fields are supplemental.

In some implementations, to receive the information for the data fields, the application server may render an interface for the administrative user to enter the information. In other implementations, the application server may render an interface for the entity associated with the new digital identity record to enter the information from the data fields. In addition or in the alternative, the application server may transmit one or more messages to a client device of the entity to receive the information for the data fields. In some implementations, the application server may retrieve identity information from a trusted third party system. For example, if the network node receives a passport number, the application server may query a trusted third party database to retrieve, for example, date of birth and place of birth. In some instances, the application server may transmit a message with the passport number to a trusted third party; and receive a response with information associated with the passport number. After the application server receives the information for the data fields, the application server may execute a next step 405.

In the next step 405, the application server may assign a status to one or more data fields. For example, if the entity associated with digital identity record is a natural person; one or more data fields may remain unverified until further information is received by the application server. For instance, the application server may require a scan of the person's passport before the application server indicates that the name of the person is verified. The statuses for the data fields may be independent from each other. For example, the application server may assign a verified status to a first data field and assign a non-verified status to a second data field.

In a next step 407, the application server may receive documents and biometric information. One having ordinary skill in the art understands that if the entity associated with the digital identity record is not a natural person, the application server may not receive the biometric information. For an entity that is a natural person, the documents may be verification documents such as a scan of a passport to verify vital information such as name and date of birth. For an entity that is a company or a corporation, the documents may be incorporation, legal, and/or tax documents. Regardless of whether the entity is a natural person or a company, the documents may verify one or more data fields in the requested new digital identity block. In some implementations, the application server may receive from an oracle one or more pieces of information associated with the documents. The one or more pieces of information may include, for example, date, time, and location of the upload or transmission of the documents. In some implementations, the location may in the form of GPS coordinates received from a mobile device.

For a natural person, the application server may receive biometric information. The biometric information may be a computer file generated by a biometric sensor. Non-limiting of examples of biometric sensors include a fingerprint sensor and retina scanners. In some implementations, the application server may receive a raw data file from a respective sensor. In other implementations, the application server may receive a processed data file from the respective sensor. In some implementations, the application server may receive from an oracle one or more pieces of information associated with the biometric information. The one or more pieces of information may include, for example, date, time, and location of the capture of the biometric information. In some implementations, the location may in the form of GPS coordinates received from a mobile device capturing the biometric information.

In a next step 409, the application server may generate a one directional cryptographic hash of the documents and the biometric information. Furthermore, the applications server may store the documents and the biometric information in respective non-blockchain repositories. For example, the application server may maintain a document repository for the documents and a biometric repository for the biometric information.

In a next step 411, the application server may generate a new digital identity record block based on one or more smart contracts and one or more encryption algorithms. A smart contract may define the data structure of the new digital identity record. In an aforementioned embodiment of digital identity record templates, the smart contract may contain the structure of the template required for the new digital identity record. Furthermore, the smart contract may also define the permissions control associated with the new digital identity record.

The permission controls within the new digital identity record may define the role of an entity associated with the digital identity record. For example the permission controls may include a permissions table or matrix delimiting the access rights and operational rights of the entity associated with the new digital identity record. The access rights may define the level of access allowed to the entity to one or more pieces of information stored within the blockchain. The operational rights may define the entity's rights to initiate blockchain based actions and transactions. In some implementations, the permission controls may be a reference to one or more smart contracts stored elsewhere in the blockchain that define the entity's access and operational rights. The permission controls may be based upon the individual entity, business relationships, entity type, and/or one or more pieces of received information in the digital identity record.

The application server may store the one directional cryptographic hash of the reference documents and the one directional cryptographic hash of the biometric information in the new digital identity record block. These one directional cryptographic hashes may allow the application server or any other computing system to verify the integrity of the document and the biometric information stored in a local repository. In other words, even though these elements may be stored locally, the cryptographic hashes stored in the blockchain are immutable and consequently allow for the immutability of the reference documents and biometric information stored in the local repositories.

The application server may use one or more encryption keys to encrypt one or more data fields in the new digital identity record block. In some implementations, the application server may use different encryption keys for different data fields in the new digital identity record block. In other implementations, the application server may use the same encryption key for all the data fields in the new digital identity block. The use of the encryption keys in the digital identity blocks may be governed by one or more smart contracts.

In a next step 413, the application server may deploy the new digital identity record block in the latest valid blockchain. In addition to the digital identity record, the application server may include other information such as updated digital payment tokens associated with other users, one or more smart contracts, and/or one or more documents in the new digital identity block. In some implementations, to deploy the new digital identity block to the blockchain, the application server may poll the network nodes and determine the latest valid blockchain. The application server may use a predetermined threshold for determining the latest valid blockchain. For example, the application server may query the network nodes for the latest blockchain. If the application server receives the same blockchain from 51% of the network nodes, the application server may determine that the received blockchain is the latest valid blockchain. One ordinarily skilled in the art appreciates that the predetermined threshold is set upon the level of integrity required for the data and instructions stored in the blockchain. The application server may use a higher predetermined threshold for data requiring a higher level of security and integrity, for example, electronic money transfers. After the application server determines the latest valid blockchain, the application server may append the new digital identity block to the latest valid blockchain. To do so, the application server may use the cryptographic hash (or simply hash) of contents of the last block of the latest valid blockchain to generate the address of the new digital identity block. In addition, the application server may use the cryptographic hash of the contents of the new digital identity block to generate the address of the new digital identity block. In some implementations, the application server may use the cryptographic hash of the contents of the last block, the cryptographic hash of the contents of the new digital identity block, and a nonce value to generate the address of the new digital identity block. The application server may store the address of the digital identity block in the database. Furthermore, the application server may store an indication in the database that the new digital identity block is an updated version of a previous digital identity block. In other words, the application server may store an indication in the database that the new digital identity block supersedes the previous digital identity block. Furthermore, the application server may encrypt the data in the new digital identity block by using an algorithm such as a hashing algorithm. The application may generate a hash value of the contents of the new digital identity block and store the hash value in the new digital identity block. For instance, the application server may hash portions of the new digital identity block separately to create intermediate hash values and generate a final hash value based on the intermediate hash values and store the final hash value in the new digital identity block. Alternatively, the application server may hash the entire content of the new digital identity block to generate the final hash value and store the hash value in the new digital identity block.

One having ordinary skill in the art understands the application server and/or an associated network node may be executing one or more smart contracts to implement one or more steps of the method 400. That is, the entire method 400 may be automatic with minimal human intervention. Furthermore, the new digital identity record may be within a smart contract or associated with a smart contract. In other words, the digital identity record may be the information part of a smart contract.

Although the aforementioned method 400 describes generating a new digital identity record, one having ordinary skill in the art understands the one or more steps of the method 400 may be used for updating a digital identity record based on new information. As an example, if a previous digital identity record includes a data field with an unverified status and the application server receives a reference document pertaining to the data field; the application server may execute one or more steps of the method 400 and change the status of the data field from unverified to verified. In some embodiments, the application server may update a status of a data field based on a user initiated or third party system initiated digital signature using a private cryptographic key. The application server may use the user's or the third party system's public key to decrypt and authenticate the digital signature. After authenticating the digital signature, the application server update the status based on a message associated with the digital signature.

It should be clear by now to one having ordinary skill in the art that the aforementioned embodiments describe a framework for digital identity and permission controls framework within a distributed network nodes environment. The systems and methods described herein provide interfaces and intelligently perform the back-end processing through blockchain events and API calls to generate, maintain, update immutable and secure digital identity records and associated permission controls. Therefore, the systems and methods are a significant improvement over the conventional computing systems, which do not provide these features. In other words, the embodiments disclosed herein solve provide technical solutions to the several technical problems in conventional blockchain technology.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for generating an encrypted digital identity record in a blockchain, the method comprising:
   receiving, by a network node, a request to generate a digital identity record within a blockchain for an entity, wherein the request contains an entity type of the entity;
   retrieving, by the network node, a digital identity record template containing multiple data fields and associated with the entity type from the blockchain;
   receiving, by the network node, information for at least one data field of the multiple data fields and a reference document from a client device associated with the entity;
   generating, by the network node, a digital identity record for the entity by associating the received information to one or more data fields in the digital identity record template;
   associating, by the network node, a first data field of the one or more data fields in the digital identity record with the reference document;
   generating, by the network node, a one directional cryptographic hash of the reference document;
   storing, by the network node, the reference document in a non-blockchain document repository;
   storing, by the network node, the one directional cryptographic hash of the reference document in the digital identity record in association with the first data field;
   encrypting, by the network node, the digital identity record using one or more encryption keys;
   generating, by the network node, a digital identity record block containing the encrypted digital identity record on the blockchain; and
   setting, by the network node, permission controls for the digital identity record based on the entity type and the received information, wherein the permission controls delimit the entity's access to information within the blockchain and rights to initiate blockchain based events.

2. The method of claim 1, further comprising:
receiving, by the network node via a biometric web application, biometric information associated with the entity;
storing, by the network node, the received biometric information to a non-blockchain biometric repository;
generating, by the network node, a one directional cryptographic hash of the received biometric information; and
storing, by the network node, the one directional cryptographic hash of the received biometric information in the digital identity record.

3. The method of claim 1, wherein the multiple data fields comprise at least one of: entity name, registered address, jurisdiction, identity document hash, identity biometric hash, permission controls, relationship, and hierarchy.

4. The method of claim 1, further comprising:
assigning, by the network, a status identifier to the one or more data fields based on the corresponding associated information, wherein the status identifier comprises at least one of verified and unverified.

5. The method of claim 4, further comprising:
updating, by the network node, the status identifier from unverified to verified.

6. The method of claim 1, wherein encrypting the digital identity record comprises:
encrypting, by the network node, a first set of data fields using a first encryption key; and
encrypting, by the network node, a second set of data fields using a second encryption key.

7. The method of claim 1, further comprising:
associating, by the network node, a globally unique random digital identity reference with the entity; and
storing, by the network node, the globally unique random digital identity reference in the digital identity record.

8. The method of claim 1, further comprising:
associating, by the network node, the digital identity record with a smart contract in the blockchain.

9. The method claim 1, further comprising:
generating, by the network node, a second digital identity record hierarchically below the digital identity record.

10. A system for generating an encrypted digital identity record in a blockchain, the system comprising:
a plurality of distributed network nodes, each including a non-transitory storage medium storing a respective local copy of a blockchain;
at least one of the plurality of distributed network nodes having a processor configured to:
receive a request to generate a digital identity record within the blockchain for an entity, wherein the request contains an entity type of the entity;
retrieve a digital identity record template containing multiple data fields and associated with the entity type from the blockchain;
receive information for at least one data field of the multiple data fields and a reference document from a client device associated with the entity;
generate a digital identity record for the entity by associating the received information to one or more data fields in the digital identity record template;
associate a first data field of the one or more data fields in the digital identity record with the reference document;
generate a one directional cryptographic hash of the reference document;
store the reference document in a non-blockchain document repository;
store the one directional cryptographic hash of the reference document in the digital identity record in association with the first data field;
encrypt the digital identity record using one or more encryption keys;
generate a digital identity record block containing the encrypted digital identity record on the blockchain; and
set permission controls for the digital identity record based on the entity type and the received information, wherein the permission controls delimit the entity's access to information within the blockchain and rights to initiate blockchain based events.

11. The system of claim 10, wherein the processor is further configured to:
receive, via a biometric web application, biometric information associated with the entity;
store the received biometric information to a non-blockchain biometric repository;
generate a one directional cryptographic hash of the received biometric information; and
store the one directional cryptographic hash of the received biometric information to the digital identity record.

12. The system of claim 10, wherein the multiple data fields comprise at least one of: entity name, registered address, jurisdiction, identity document hash, identity biometric hash, permission controls, relationship, and hierarchy.

13. The system of claim 10, wherein the processor is further configured to:
assign a status identifier to the one or more data fields based on the corresponding associated information, wherein the status identifier comprises at least one of verified or unverified.

14. The system of claim 13, wherein the processor is further configured to:
update the status identifier from unverified to verified.

15. The system of claim 1, wherein the processor is further configured to encrypt the digital identity record by:
encrypt a first set of data fields using a first encryption key; and
encrypt a second set of data fields using a second encryption key.

16. The system of claim 10, wherein the processor is further configured to:
associate a globally unique random digital identity reference with the entity; and
store the globally unique random digital identity reference in the digital identity record.

17. The system of claim 10, wherein the processor is further configured to:
associate the digital identity record with a smart contract in the blockchain.

18. The system claim 10, wherein the processor is further configured to:
generate a second digital identity record hierarchically below the digital identity record.

* * * * *